(No Model.) 2 Sheets—Sheet 1.
H. BEHR.
VELOCIPEDE.
No. 396,349. Patented Jan. 15, 1889.
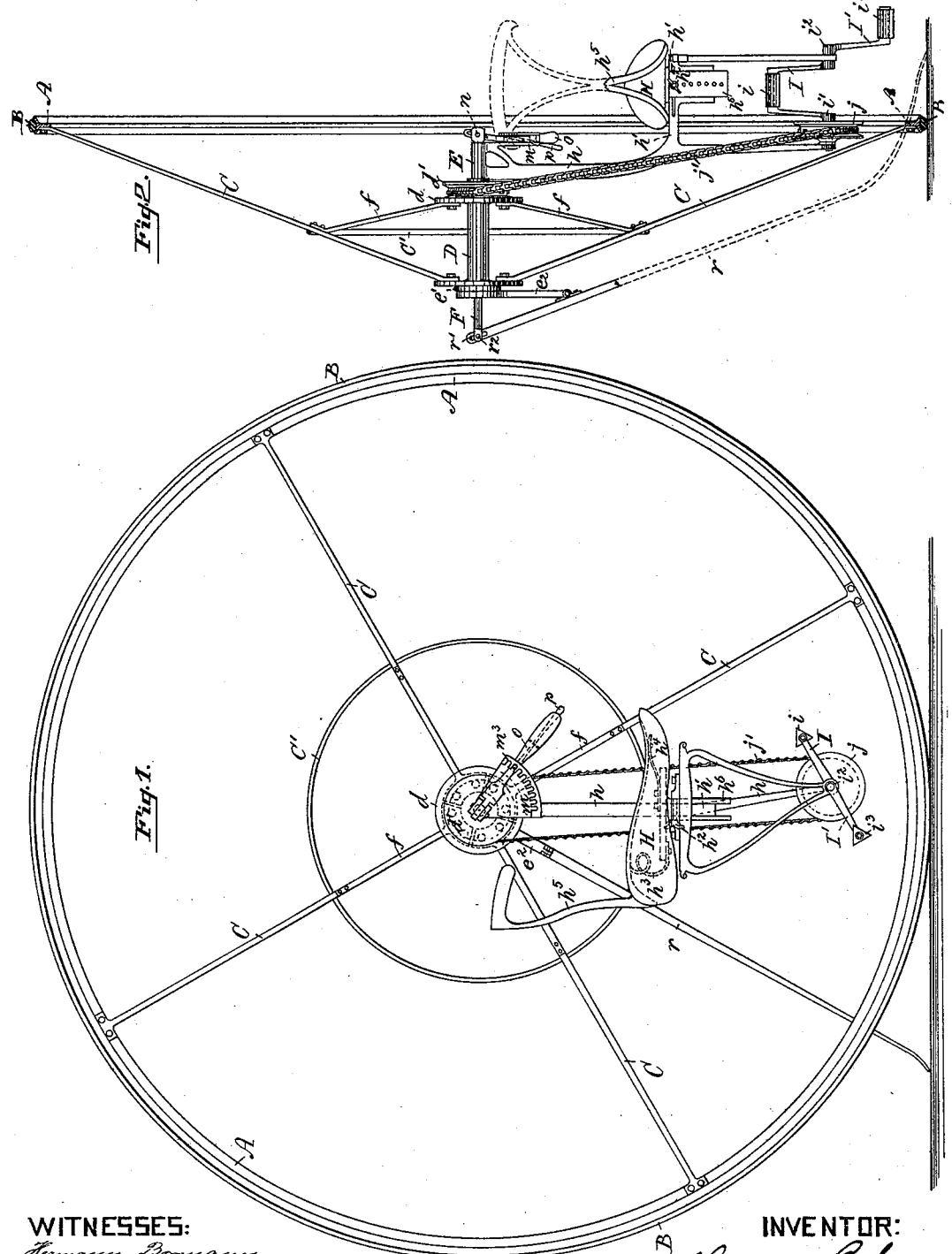
WITNESSES:
INVENTOR:

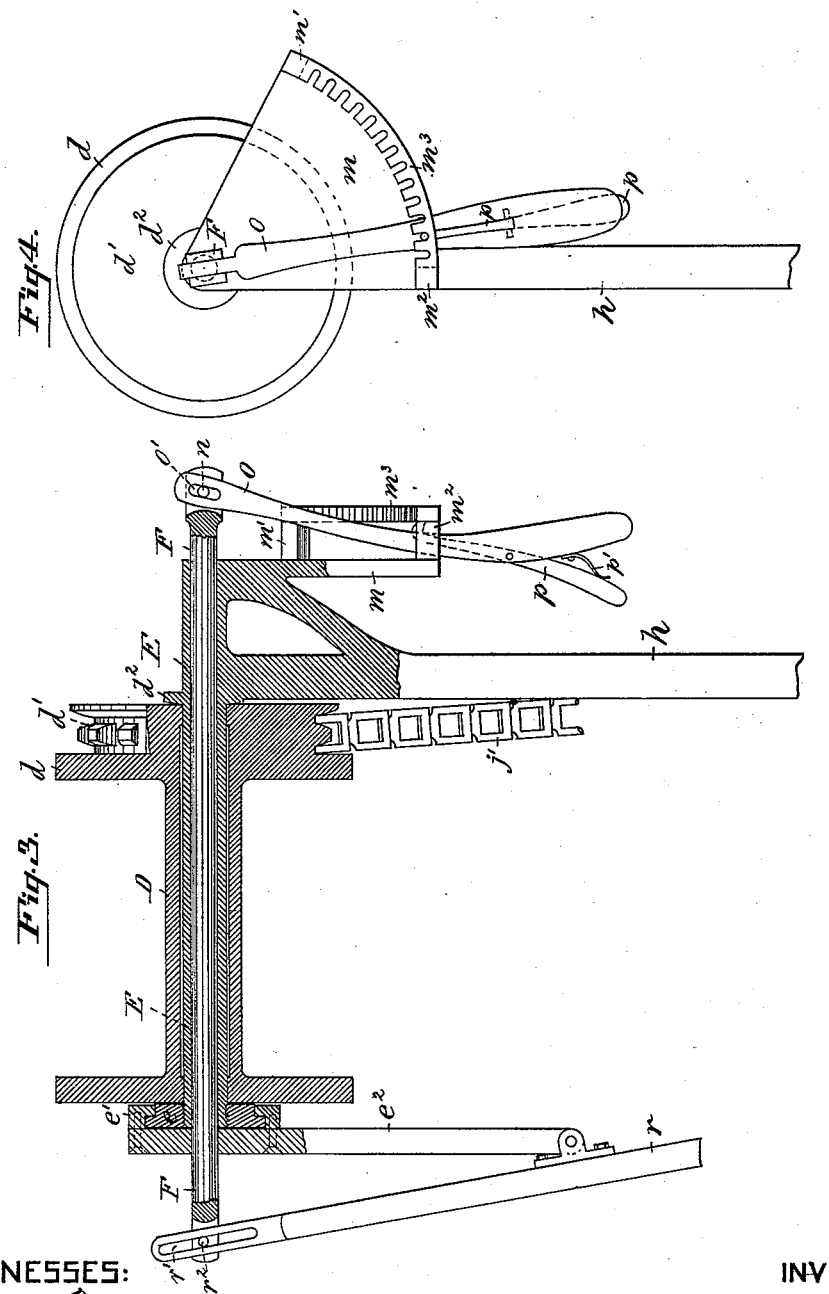

UNITED STATES PATENT OFFICE.

HERMANN BEHR, OF PHILADELPHIA, PENNSYLVANIA, ASSIGNOR OF ONE-HALF TO G. WILLIAM FRIEDGEN, OF SAME PLACE.

VELOCIPEDE.

SPECIFICATION forming part of Letters Patent No. 396,349, dated January 15, 1889.

Application filed April 25, 1888. Serial No. 271,813. (No model.)

*To all whom it may concern:*

Be it known that I, HERMANN BEHR, a subject of the Emperor of Germany, but now residing at the city of Philadelphia, in the county of Philadelphia and State of Pennsylvania, have invented certain new and useful Improvements in Monocycles, of which the following is a specification.

My invention relates to certain improvements in that class of vehicles having but a single wheel, and designated as a "monocycle."

The general objects of my invention are to simplify the construction of a monocycle, whereby its efficiency and ease of movement may be enhanced, and to provide the same with improved mechanisms and devices operated by hand for steering, checking the speed of, and stopping the vehicle *ad libitum*.

My invention consists of a wheel or rolling rim in which the actuating, steering, and stopping mechanisms and devices are located on one side thereof beyond, yet nevertheless approaching, the vertical median line of said rolling rim, and with an adjustable seat for supporting the occupant, having supported cranks with pedals mounted thereon for the feet of the operator to impart motion to the propelling mechanism, and devices on the opposite side of said rim beyond said median line, whereby the center of gravity of the load—that is, of the person occupying the seat—will be as near as possible below the median transverse axis of the wheel. The monocycle so constructed may be easily mounted and dismounted without danger of overturning, which has been one of the principal objectionable features attending upon the use of monocycles as heretofore constructed, with spokes arranged on both sides of the rolling rim of the vehicle, with the seat suspended therein. Then in this construction of a monocycle the occupant or rider is afforded an unobstructed view around, about, and in advance of the vehicle. If from any unforeseen cause the vehicle should tend to overturn, it may be obviated, in my construction of a monocycle, by the rider simply grasping some part of the mechanism on the opposite side of the seat, because of the fact that he has free use of his hands and arms, in contradistinction to what has been the case in the use of many of the monocycles as heretofore made.

The nature of my invention will be more particularly understood taken in connection with the accompanying drawings, forming part hereof, and in which—

Figure 1 is an elevation of my improved monocycle, showing also the mechanisms and devices for propelling, steering, and stopping the same. Fig. 2 is a vertical central section through the rolling rim of the vehicle, showing also the mechanisms and devices for propelling, steering, and stopping the same, and the adjustable seat. Fig. 3 is a detail view, partly in section and in elevation, showing a portion of the mechanism for propelling, steering, and stopping the monocycle; and Fig. 4 is a front view of the lever for actuating the steering and stopping mechanism and the curved rack for locking said lever in the desired position.

Referring to the drawings for a detailed description of my invention, A is the rolling rim or tire, made of suitable metal, and preferably T-shaped in cross-section, with the top or face curved or grooved out for the reception of a ring, B, made of rubber or other material.

C represents four or more truss-rods of suitable light construction, which are arranged equidistant from each other and bolted or otherwise secured at one of their extremities to the web of the tire or rolling rim A, and at their opposite extremities to one of the heads of the axle-box D, mounted on a hollow axle, E. To the respective truss-rods C is bolted a ring, C', for the purpose of strengthening said rods and preventing them from becoming twisted in the actuation of the propelling or steering mechanisms or devices, to be fully described.

The axle-box D has formed integral therewith, at its opposite extremity, an enlarged head or disk, $d$, and a sprocket-wheel, $d'$. To the disk or head $d$ of the axle-box D are bolted four or more stay-rods, $f$, which rods are also bolted or otherwise secured to the truss-rods C, for holding said box firmly in position.

F is a horizontal spindle, which passes through the hollow axle E, the extremities of which are preferably formed square, for a purpose to be presently described.

The outer extremity of the hollow axle E has secured to it a recessed disk, $e$. Onto this recessed disk $e$ is fitted an oppositely-recessed cap, $e'$, which is secured to the annular extremity of a depending arm, $e^2$, hinged to the depending steering-bar $r$, pivotally connected with the extremity of the spindle F. The hollow axle E, on which the axle-box D is loosely mounted, has near the opposite extremity a disk or washer, $d^2$, which rests against the surface of the sprocket-wheel $d'$, forming a part of said axle-box. The surface of the disk or washer $d^2$ in contact with the outer surface of the sprocket-wheel $d'$ is slightly curved, so as to obviate undue friction thereat, thus insuring an easy movement of the mechanism that is caused to propel the vehicle. The hollow axle E has also formed integral therewith a depending arm, $h$, having a central horizontal projection or seat, $h'$, with a slot therein for the reception of a suitable form of seat, H, held in any desired position by means of an adjusting-screw, $h^2$. This seat H is provided with springs $h^3$ and $h^4$, which are surrounded by canvas and leather or other strong material. The seat is preferably provided with a back, $h^5$, of a suitable construction. The depending arm $h$ projects downward beneath the horizontal projection or seat $h'$ thereof, and has in its lower extremity an opening which forms a bearing for one of the wrists of the double cranks I and I′, on one of which the pedal $i$ is mounted. On the wrist $i'$ of the crank I a sprocket-wheel, $j$, is mounted, which is connected with the sprocket-wheel $d'$ by means of a chain, $j'$. The horizontal projection $h'$ of the depending arm forming the support for the seat has a depending triangular-shaped bracket secured to it at the outer extremity, with an opening in the lower portion thereof, in which is held the wrist $i^2$ of the crank I′, whereby, through the actuation of the pedals $i$ and $i^3$, mounted on the cranks I and I′, by the feet of the rider motion may be imparted to the sprocket-wheels $d'$ and $j$. The seat H is provided with a depending square-shaped rod, $h^6$, having a series of openings therein to permit of the raising or lowering of the same to accommodate persons of different heights.

The seat H should be supported in such manner that the center of gravity of the load, or, in other words, of the person occupying the seat, will be as near as possible below the middle of the axis of the vehicle.

Cast preferably with the depending arm $h$ is a sector, $m$, with two posts, $m'$ and $m^2$, secured thereto, and suitably attached to these posts is a curved rack, $m^3$. To the square extremity of the spindle F is fitted a pin or bolt, $n$, having an enlarged head. Mounted on this pin or bolt $n$ and resting against the surface of the spindle F is a depending lever, $o$, with an oblong slot, $o'$, in its upper extremity. Pivoted to this lever $o$ is a latch-bar, $p$, and secured to the lever $o$ is a curved spring, $p'$, the free extremity of which rests snugly up against the latch-bar $p$. This latch-bar $p$ is normally held in contact with the rack $m^3$. To the opposite square-shaped extremity of the spindle F is attached a depending bar, $r$, having an oblong slot, $r'$, in its upper extremity, and which bar is attached to the spindle F by means of a headed pin or bolt, $r^2$, the lower extremity of this depending bar being curved slightly to its free extremity. To this depending bar $r$ is suitably hinged the depending bar $e^2$, secured to the recessed cap $e'$, the depending bar $r$ forming the means by which the vehicle may be steered or the speed of the vehicle decreased or stopped, by means of the lever $o$ and its latch-bar $p$, operated by the hand of the rider.

Having described the construction of the monocycle, I will now proceed to briefly explain the manner of operating the same.

Assuming that the monocycle or vehicle occupies the position as illustrated in Figs. 1 and 2, the rider mounts the seat on the right thereof, placing his feet upon the pedals $i$ and $i^3$, and with the left hand grasps the lever $o$, and at the same time the latch-bar $p$, which, by compressing the spring $p'$, releases said latch-bar from its engagement with the rack $m^3$, thereby enabling the operator to readily elevate the slightly-curved depending bar $r$ out of contact with the ground. This bar $r$, by means of the lever $o$, may be readily operated for checking the speed *ad libitum* of the vehicle by the mere movement of the same backward and forward between the sector $m$ and the rack $m^3$; or it may be used for steering the vehicle in motion by bringing the same into different positions in contact with the ground by the occupant of the vehicle while propelling it forward, by actuating the pedals $i$ and $i^3$, mounted on said cranks I and I′, as hereinbefore fully described.

Having thus described the nature and objects of my invention, what I claim as new, and desire to secure by Letters Patent, is—

1. A monocycle consisting of a rolling rim, truss-rods connected with said rim and an axle-box and located on one side beyond the vertical median line of the rim, stay-rods connected with said box and truss-rods, an axle in said box, and a depending bracket carrying an adjustable seat on the opposite side beyond said vertical median line, cranks supported beneath said seat, and means connected with said box and cranks for causing motion to be imparted to said vehicle, substantially as described.

2. A monocycle consisting of a rolling rim, rods connected with said rim and a box and located on one side beyond the vertical median line of said rim, an axle passing through said box, a depending bracket formed integral with said axle and having a slotted projection, in which an adjustable seat is mounted, and cranks journaled in the depending arm, and an arm depending from said projection, and means connected with said box and cranks, whereby motion may be imparted to said vehicle, substantially as described.

3. A monocycle consisting of a rolling rim or wheel, truss-rods connected with said rim and a box, stay-rods connected with said rods and box, a hollow axle and a spindle mounted in said box and located on one side beyond the vertical median line of said rim, a depending bracket mounted on said spindle having a slotted projection, a seat mounted therein and located beyond said vertical median line, cranks supported beneath said seat, and means connected with said box and cranks, whereby motion may be imparted to said vehicle, all arranged as shown and described.

4. The herein-described monocycle provided with rods attached to a rolling rim and an axle-box, stay-rods attached to said rods and box, a hollow axle and a spindle mounted in said box, a depending arm pivotally connected with one extremity of said spindle, and means, as described, connected with the opposite extremity of said spindle, whereby said depending rod may be actuated, as shown and for the purposes set forth.

5. A monocycle consisting of a rolling rim and truss-rods attached to said rim and an axle-box, stays connected with said rods and box, a hollow axle and a spindle mounted in said box, a depending arm pivotally connected with one extremity of said spindle and with said hollow axle by means of a rod hinged thereto, a lever pivotally connected with the opposite extremity of said spindle, a latch-bar pivoted to said lever, and a sector with a rack formed integral with said hollow axle, substantially as and for the purposes set forth.

6. A monocycle provided with truss-rods attached to the rolling rim and to an axle-box, stays secured to said box and truss-rods, a ring secured to said truss-rods for strengthening them, a hollow axle and a spindle mounted in said box, a depending bar connected with said spindle, and means connected with said axle and spindle for actuating and holding said bar in a desired position and located beyond the vertical median line of said rolling rim, a depending bracket formed integral with said axle and extending beyond the median line on the opposite side of said rolling rim and provided with a slotted projection, an adjustable seat held therein, cranks supported beneath said seat, and means connected with said cranks and box, whereby motion may be imparted to said vehicle, substantially as and for the purposes set forth.

In witness whereof I have hereunto set my hand in the presence of two subscribing witnesses.

HERMANN BEHR.

Witnesses:
THOMAS M. SMITH,
HERMANN BORMANN.